US00RE34131E

United States Patent [19]

Vriens et al.

[11] E Patent Number: Re. 34,131

[45] Reissued Date of Patent: Nov. 24, 1992

[54] DISPLAY TUBE HAVING IMPROVED BRIGHTNESS DISTRIBUTION

[75] Inventors: Leendert Vriens; Johannes H. M. Spruit, both of Eindhoven, Netherlands; John A. Clarke, Carshalton, England

[73] Assignee: U.S. Philips Corporation, New York, N.Y.

[21] Appl. No.: 639,481

[22] Filed: Jan. 9, 1991

Related U.S. Patent Documents

Reissue of:

[64] Patent No.: 4,804,884
Issued: Feb. 14, 1989
Appl. No.: 645,922
Filed: May 1, 1987

[51] Int. Cl.[5] ..... H01J 29/28; H01J 29/89

[52] U.S. Cl. ..... 313/474; 313/478; 358/237; 358/253; 359/589

[58] Field of Search ..... 313/112, 466, 473, 474, 313/478; 358/64, 225, 237, 238, 250, 253; 350/163-166; 427/72, 106, 107

[56] References Cited

U.S. PATENT DOCUMENTS 4,365,183 12/1982 Kloss ..... 313/474 X
4,683,398 7/1987 Vriens et al. ..... 313/112 X

FOREIGN PATENT DOCUMENTS 170320 5/1986 European Pat. Off. .
1088629 10/1967 United Kingdom .
1199006 7/1970 United Kingdom .

*Primary Examiner*—Donald J. Yusko
*Assistant Examiner*—Michael Horabik
*Attorney, Agent, or Firm*—John C. Fox

[57] ABSTRACT

A projection television system comprising an array of three projection television display tubes (14) luminescing in red, green and blue, a focusing lens (16) associated with each tube and a display screen (12) on which the respective optical images are merged to form a single multicolored image. At least one of the display tubes (14) has a multilayer interference filter (46) between the phosphor (30) and the faceplate (20). In order to imprve the light output at the corners of the display screen (12), the cut-off angle of the first filter layers is varied between the center and the corners thereof, for example by increasing the optical thickness of the filter layers relative to the center.

45 Claims, 7 Drawing Sheets

DISPLAY TUBE HAVING IMPROVED BRIGHTNESS DISTRIBUTION

Matter enclosed in heavy brackets [ ] appears in the original patent but forms no part of this reissue specification; matter printed in italics indicates the additions made by reissue.

BACKGROUND OF THE INVENTION

The present invention relates to a projection television system comprising projection television display tubes having curved faceplates. One or more of the tubes have interference fitters on the inside surfaces of their respective faceplates.

Existing projection television systems are regarded as having a moderate brightness on the projection screen; a poor chromaticity due to the commonly used Tb activated green phosphors, because the contribution of the orange and red spectral lines is too large for these phosphors; a loss in resolution on the projection screen due to chromatic aberration of the lenses, especially for the commonly used green (Tb-activated) and blue (ZnS:Ag) phosphors; and a moderate contrast.

In order to mitigate these problems it has been proposed for example in European Patent Publication No. 0170320 to provide interference filters between the phosphor layer and the glass faceplate. These interference filters transmit light of a desired wavelength in forward and near forward directions. At larger angles, up to 90 degrees to the faceplate normal, the interference filter reflects the light of this wavelength. This light is rescattered in the phosphor layer and does have a chance to leave the tube at a small angle to the faceplate normal, resulting in a gain in brightness in the near forward directions. At smaller wavelengths the filters transmit light up to larger angles, so that the relative gain in brightness in the forward direction becomes lower. At longer wavelengths the filter transmits the light up to smaller angles, or even blocks the light in forward direction. As the filter works color selectively, the chromaticity improves and the chromatic aberration due to projection lenses reduces.

At large focal length lenses, that is those where the focal length is greater than the diagonal of the scanned phosphor area on the faceplate, for example 130 mm for a 5" (125 mm) diagonal scanned area and 180 mm for a 7" (175 mm) diagonal scanned area, the entrance pupil of the lens is relatively far away from the phosphor layer, and therefore the acceptance angles of the lens are relatively small, even in the corner of the faceplate. However, if one uses a closed rear projector, there is a trend to use smaller focal length lenses (down to half of the diagonal of the tube faceplate), in order to keep the cabinet size acceptable. The entrance pupil of these lenses is closer to the faceplate, which results in an increase of the lens acceptance angles for light from the corners of the faceplate. Using the same type interference filter as has been used previously with the larger focal length lenses results in:

(a) An unacceptable drop in brightness going from the center to the corner of the projection screen, because the interference filter reflects the light of the desired wavelength at these large angles. This drop in brightness comes on top of the normal drop in brightness due to the obliquity of the principal ray with respect to the faceplate normal and due to vignetting by the lens elements.

(b) A color shift over the projection screen, because the filters work color selectively. A shift to the shorter wavelengths (blue) will occur on the screen, going from the center to the corners.

One way of mitigating these problems is to use an interference filter which transmits light up to larger angles. However, the gain in brightness is then much smaller, and a color shift will still occur. It has been suggested in unpublished British patent Application No. 8513558 to which U.S. Pat. No. 4,683,398 corresponds, to use a projection TV tube with an interference filter and a curved faceplate. In this way the angles to the faceplate normal tilt over to match the lens acceptance angles. The smallest radius of faceplate curvature to be practical is expected to be about 2.5 to 3 times the diagonal of the scanned phosphor area on the faceplate. At smaller radii problems occur with dynamic focusing of the electron beam, filter deposition, phosphor deposition and corrections in the deflection of the electron beam due to picture distortion. This means that with the small focal length lenses (<0.75 times the diagonal of the scanned phosphor area on the faceplate), which enable systems to be built into the desired small cabinet sizes, the problems due to the too large acceptance angles of the lens still occur.

An examination of the gains in luminance and chromaticity achieved by using short focal length lenses with display tubes having curved faceplates on which are deposited interference filters having dielectric layers with substantially constant thickness over the faceplate area shows that the gains at the center for filters having relatively low cut-off angles is greater than for filters having relatively high cut-off angles whereas the situation was substantially the opposite at the corners. Although there is invariably a lower light output from the corners of the screen compared to the center it is desired to reduce the differential between them.

SUMMARY OF THE INVENTION

The inventive projection television display tube includes an envelope having an optically transparent faceplate, the internal surface of the faceplate being convex as viewed from the interior of the envelope. A multilayer interference filter is applied on the internal surface of the faceplate and a cathodoluminescent screen is applied on the filter. The filter has 6 layers each having at its center an optical thickness nxd, wherein n is the refractive index of the material of the layer and d is the thickness. The optical thickness of the individual layers is between $0.2\lambda_f$ and $0.3\lambda_f$, the average optical thickness being $0.25\lambda_f$, wherein $\lambda_f$ is equal to p x $\lambda$, where $\lambda$ is the desired central wavelength which is selected from the spectrum emitted by the luminescent material and p is a number between 1.18 and 1.32, and wherein the cut-off angle is greater at the corners than at the center. The cut-off angle is the minimum angle at which light of a given wavelength is reflected rather than transmitted.

According to another aspect of the present invention there is provided a projection television system including three projection television display tubes having cathodoluminescent screens luminescing in respective different colors, focusing lens means associated with each display tube and a viewing screen on which the images on the display tube screens are merged to form a multicoloured image. Each tube has a faceplate which is convex as viewed from inside the envelope, at least one display tube has a multilayer interference filter between its cathodoluminescent screen and its faceplate, the filter comprising at least 6 layers each having at its centre an optical thickness nxd, wherein n is the refractive index of the material of the layer and d is the thickness. The optical thickness of the individual layers of the filter being between $0.2\lambda_f$ and $0.3\lambda_f$, the average optical thickness throughout the multilayer stack being $0.25\lambda_f$, wherein $\lambda_f$ is equal to $p \times \lambda$, where $\lambda$ is the desired central wavelength which is selected from the spectrum emitted by the luminescent material and p is a number between 1.18 and 1.32, and wherein the cut-off angle is greater at the corners than at the center.

A convenient way to vary the cut-off angle is to vary the thickness of the filter layers so that they are thicker at the corners than at the center.

The thickness variation may be substantially the same for successive layers yielding a proportional variation of p and $\lambda_f$. The variation in thickness and thus of p and $\lambda_f$ may increase progressively from the center to the corners.

In one embodiment the internal surface of the faceplate is substantially spherical. In another embodiment the internal surface of the faceplate is aspherical such that the curvature at and near the center is greater than or less than the curvature at a larger distance from the center. It is possible that the curvature may disappear (that is become infinite) at some parts of the faceplate.

When the convex faceplate has a rectangular profile, with a shorter y-axis and a longer x-axis, then a smaller layer thickness at the ends of the y-axis (y max) than at the center may be tolerated as long as the layer thicknesses at the ends of the x-axis (x max) and in the diagonal corners are greater than at the center.

In another embodiment the variation in the thickness of the layers, relative to their thickness at the center, is such that the thickness at the ends of the shorter y-axis (y max) is smaller than at the center and the thickness at the ends of the longer x-axis (x max) and at the ends of the diagonals is greater than at the center, and wherein the layer thickness at the ends of the diagonals is less than the thickness at x max.

Another way of varying the cut-off angle would be to vary slightly the refractive index of each layer between the center and the corners of the faceplate and maintaining the actual thickness of the layer constant. The net result would be that the optical thickness of the layer changes in accordance with the change in refractive index. In practice however it will be much more difficult to realize a refractive index variation in a layer than to vary its layer thickness.

A further way of varying the cut-off angle would be to alter both the actual thickness of each layer between the center and the edge and also to vary slightly the refractive index between the center and the corners. Both measures together would produce a desired change in the optical thickness. This latter method is more realistic than the previous method of only varying the refractive index. Oblique evaporation in a planetary type of evaporation apparatus may for instance result in a slight variation in refractive index over the faceplate area.

Interference filters with 6 layers give only a marginal gain which can be improved by having a greater number of layers. A filter having 9 layers having a performance which is significantly better than a filter with 6 layers and an even better performance is obtainable by interference filters having more than 13 layers, for example between 14 and 30 layers.

A method of producing a multilayer interference filter on a convex surface of a substantially rectangular faceplate, the thickness of each layer being greater at x max and in the corners than at the center, includes the steps of mounting the faceplate on a rotatable calotte, evaporating a filter material at angles smaller than $\pm 15°$ to the perpendicular to the convex surface onto the faceplate using electron beam evaporation, the calotte being rotated, and varying the deposition of evaporated material onto the faceplate by selective masking so that the layer thickness increases with increasing x, with $x=0$ at the centre of the faceplate.

The variation in thickness may thus be obtained by intermittently masking a predetermined area of the convex surface of the faceplate, in particular the central area, as the faceplate is rotated relative to the evaporation sources.

The method of producing a multilayer interference filter on a convex surface of a substantially rectangular faceplate, the thickness of each layer being greater at the corners than at the center, may include obliquely evaporating a filter material onto the convex surface of the faceplate as it is rocked substantially continuously, the distance from the electron gun to the center of the faceplate being greater than that to the adjacent corner of the faceplate.

The rocking motion may be imparted to the faceplate by rotating the faceplate in a substantially planetary manner relative to the electron beam evaporation source.

It is known to vacuum evaporate a multilayer interference filter comprising alternate high and low refractive index layers on to the concave surface of parabolic cold light mirrors. In British Patent Specification No. 1088629 the vacuum evaporation of the filter material on to rotating mirrors is substantially normal. British Patent Specification No. 1199006 discloses obliquely evaporating material onto planetary rotated mirrors in order to obtain a greater layer thickness at the edge than at the center. However neither of these specifications disclose how to evaporate variable thickness filter layers onto a convex surface.

BRIEF DESCRIPTION OF THE DRAWING

In the drawings the same reference numerals have been used to indicate corresponding features.

DETAILED DESCRIPTION OF THE PREFERRED EMBODIMENTS

Figure 1:
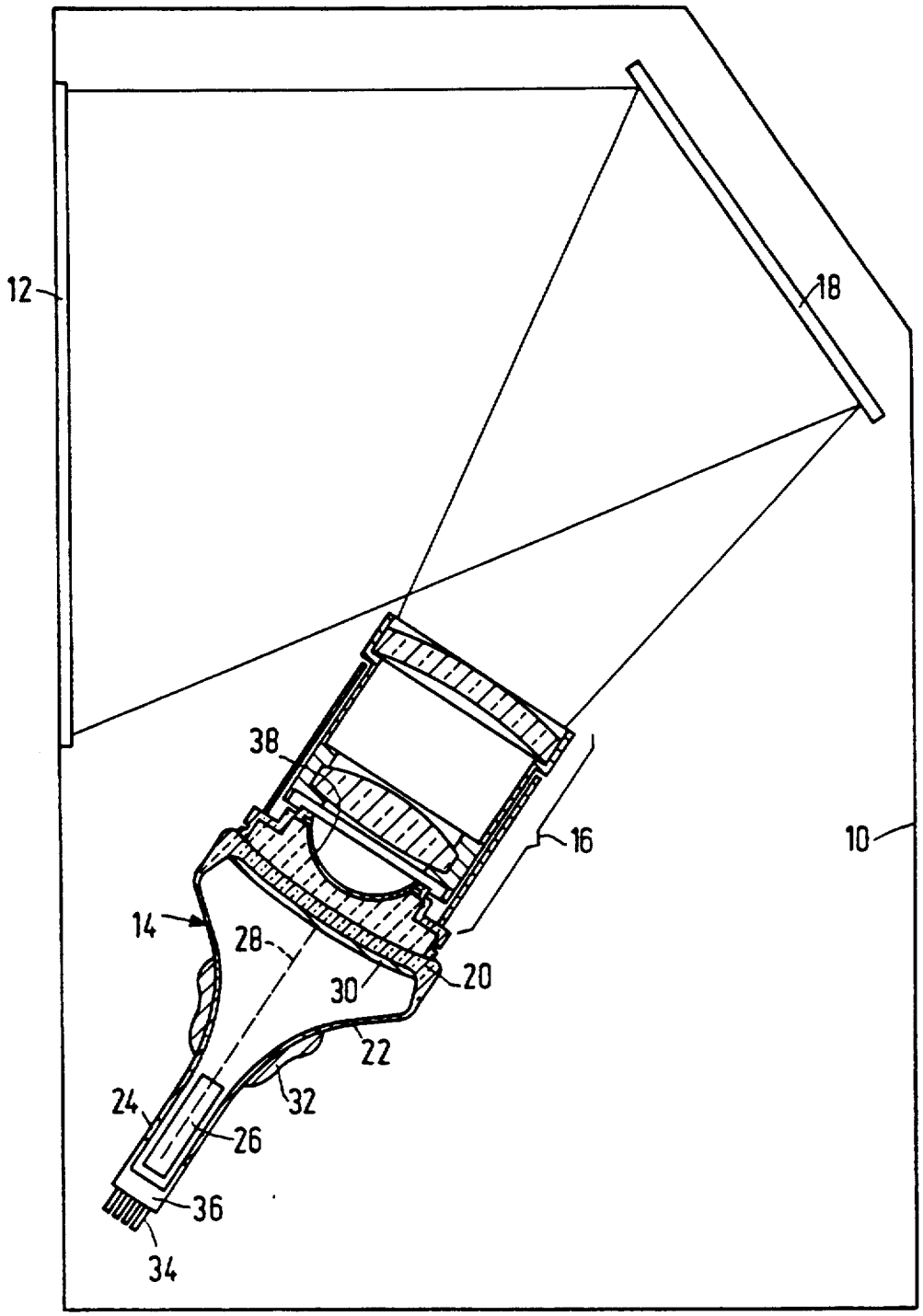
FIG. 1 is a diagrammatic view of an embodiment of one type of a projection television system made in accordance with the present invention.

The projection system illustrated in FIG. 1 comprises a cabinet 10 having a viewing screen 12 mounted in the upper part of its front wall. In the lower part of the cabinet 10 three adjacently mounted projection television tubes 14 are provided, only one of which is shown in the drawing. The cathodoluminescent phosphors of the tubes 14 emit respectively red, green and blue light. The light produced by each tube is focused by means of a short focal length lens arrangement 16 onto the screen 12, the light from the lens 16 being reflected onto the screen 12 by an inclined mirror 18. The longitudinal axes of the three tubes 14 are inclined relative to each other so that the projected images from the tubes merge at the screen 12 to form a color image.

Each tube 14 comprises an envelope formed by a curved faceplate 20, a cone 22 and a neck 24. The faceplate 20 is of substantially rectangular form with rounded-off corners, when viewed in elevation and is proportioned so that it can display for example the customary 4 units wide by 3 units high television image or possible high definition television images 5 or 5.33 units wide by 3 units high. Viewed from inside the envelope, the internal surface of the faceplate 20 is convex for example spherically convex with a radius of curvature, rc, of 350 mm.

Within the envelope is provided an electron gun 26 which produces an electron beam 28 which is scanned over a cathodoluminescent screen 30 applied to the interior of the faceplate 20 by means of an electromagnetic deflection yoke 32 mounted externally of the envelope at the neck 24/cone 22 transition. Electrical connections to the electron gun 26 are by way of pins 34 mounted in an end cap 36 hermetically sealed to the neck. A negative lens 38 is mounted near the external surface of the faceplate 20. The negative lens 38 functions as a field corrector and may have spherical or aspherical surfaces. The lens may be solid or part of it may be liquid to form a contacting or cooling medium. Although attached to the faceplate the lens actually forms part of the lens 16.

Optionally, the projection lens arrangement 16 (FIG. 1) may comprise aspheric lens elements.

The projection television system according to FIG. 1 is compact. The focal length, f, of the lens arrangement 16, the radius of curvature, rc, of the faceplate and the diagonal or diameter, D, of the scanned phosphor area are related as follows: $f+10000/rc<D$, the values of f, rc and D being in millimeters.

Figure 2:
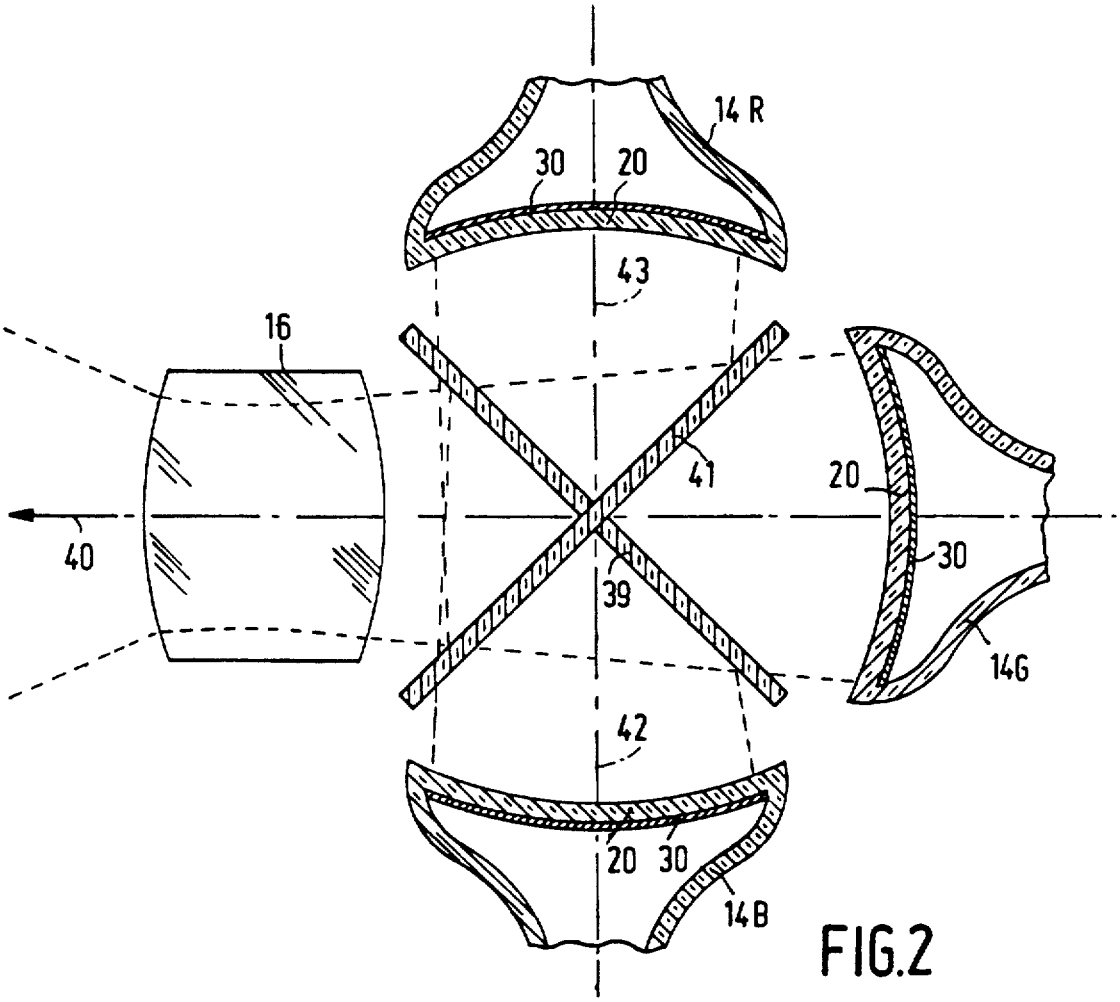
FIG. 2 is a diagrammatic view of part of an embodiment of another type of a projection television system having three orthogonally disposed projection television tubes, the light outputs from which tubes are combined with the aid of dichroic mirrors.

FIG. 2 shows the curved faceplates of three orthogonally arranged projection television tubes 14R, 14G and 14B, light from these three tubes is combined and projected through an aspherical lens arrangement 16. In combining the light, the light rays of the blue tube 14B are reflected by a dichroic mirror 39 inclined at an angle of 45° with axis 40. The rays of the red tube 14R are reflected by a dichroic mirror 44, which likewise is inclined at an angle 45° with axis 40. The rays of the green tube 14G are passed by the blue and red light reflecting mirrors 39 and 41. The light rays combined in this manner are projected onto a projection screen 12 (not shown) by means of the aspherical lens arrangement 16, and a color image is formed on the screen. The optical axes 42 and 43 of the tubes 14B and 14R coincide and are coplanar with the optical axis 40 of tube 14G. The optical axis 40 is perpendicular to the axes 42 and 43 and also constitutes the optical main axis of the system.

Figure 3:
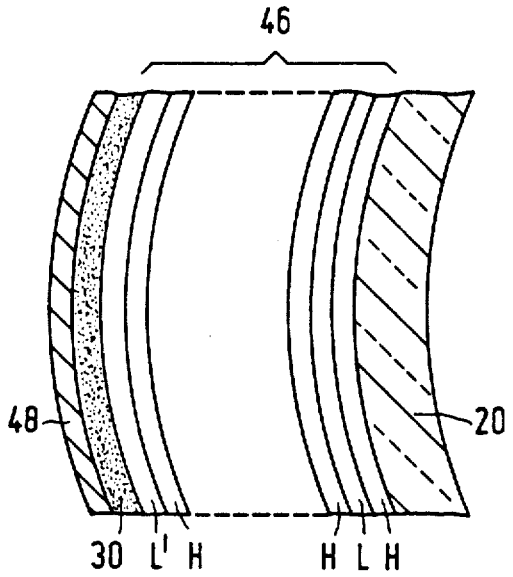
FIG. 3 is a diagrammatic cross-sectional view of a faceplate and screen structure.

FIG. 3 illustrates a cross-sectional view, not to scale, of a part of the faceplate structure of the tubes 14 (FIG. 1) and 14B, 14G, 14R (FIG. 2). The structure comprises the curved faceplate 20 on the internal surface of which is applied a multilayer interference filter 46. The cathodoluminescent phosphor screen 30 is applied as a layer to the filter 46 and a thin aluminium filter 48, frequently termed the aluminium backing, is applied to the phosphor layer.

The general structure and the optical characteristics of the interference filter 46 are known from, for example, European Patent Publication No. 0 170 320 and U.S. Pat. No. 4,683,398, details of which are incorporated by way of reference. However, in the type of interference filters disclosed previously, the thickness of each filter layer is substantially constant over its entire area although the thickness of adjacent layers may vary. In embodiments of the display tube made in accordance with the present invention, the optical thickness, and hence is the values of p and $\lambda_f$, and also the actual thickness, of each filter layer is greater at the corners by between 1% and 6% than at the center.

The interference filter 46 is composed of at least 6 layers, more typically between 14 to 30 layers, for example 20 layers. Alternate layers comprise a material having a high (H) refractive index (n) and a material having a low (L) refractive index. The high refractive index material can be $TiO_2$ ($n=2.35$), $Ta_2O_5$ ($n=2.0$) or $Nb_2O_5$ ($n=2.15$) and the low refractive index material can be $SiO_2$ ($n=1.47$) or $MgF_2$ ($n=1.38$). The optical thickness (nxd), where d is the actual thickness, is between $0.2\lambda_f$ and $0.3\lambda_f$, typically between $0.23\lambda_f$ and $0.27\lambda_f$, where $\lambda_f$ is the central wavelength of the filter 46. $\lambda_f$ is equal to $p\times\lambda$, where $\lambda$ is the desired central wavelength selected from the spectrum emitted by the cathodoluminescent material and p is a number between 1.18 and 1.36. The average optical thickness of the layers if $0.25\lambda_f$. On a frequency scale $1/\lambda_f$ corresponds to the center of the reflection band with perpendicular incidence of the light. The filter 46 may have a low refractive index terminating layer L' which has a thickness of the order of $0.125\lambda_f$.

Figure 4:
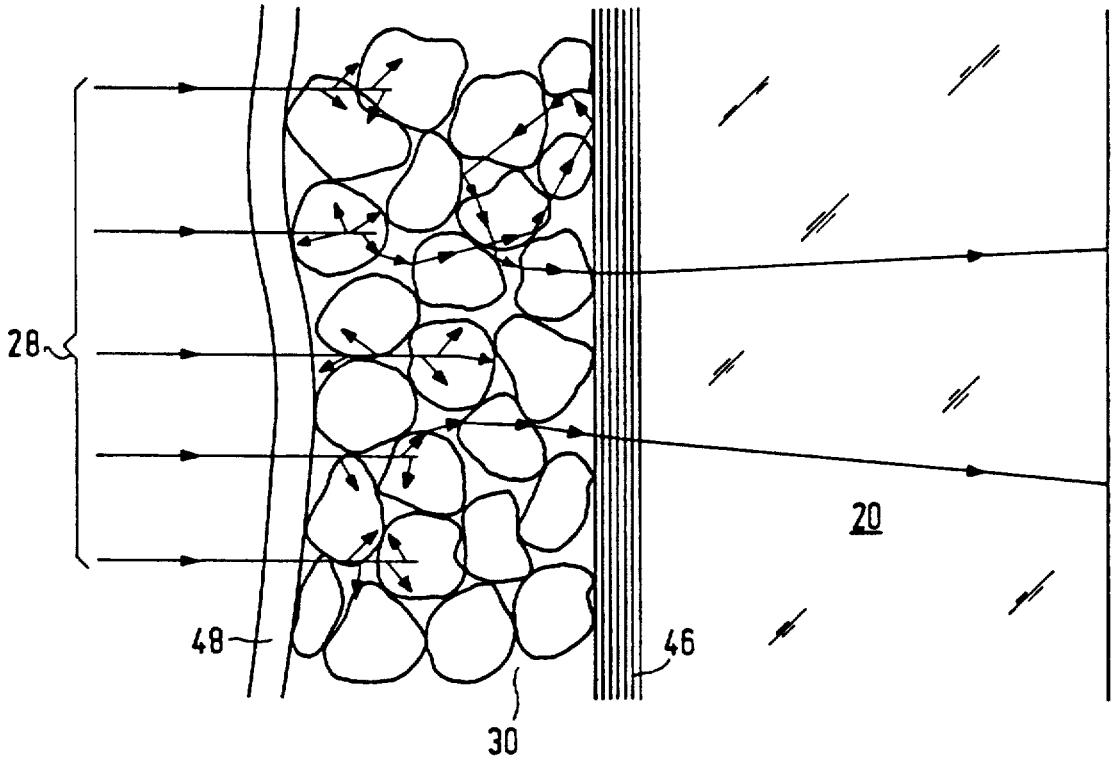
FIG. 4 is a further enlarged view of a faceplate and screen structure illustrating the operation of a multilayer interference filter.
Figure 5:
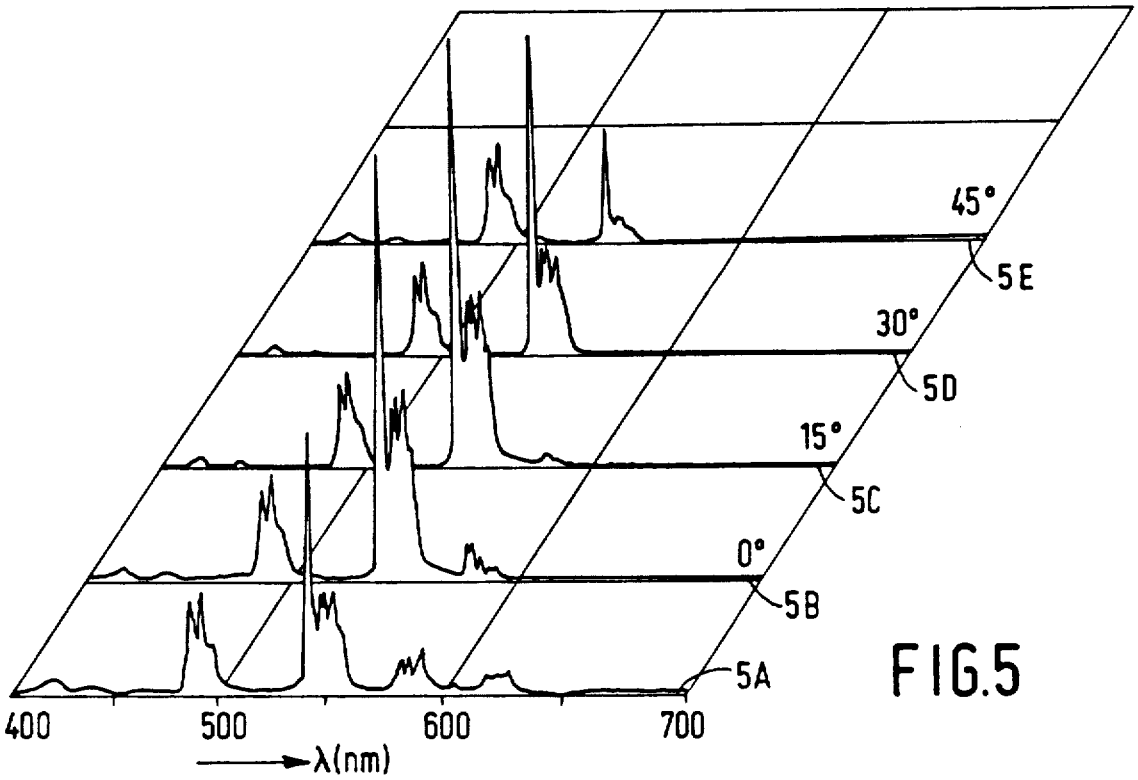
FIG. 5 illustrates the effect of an interference filter on the spectral characteristics of a terbium activated phosphor.

FIG. 4 illustrates the operation of the filter 46. The filter 46 behaves as a small angle pass filter since light incident at angles up to say 35° to the normal is transmitted by the filter 46 whereas light incident at greater angles is reflected internally within the phosphor layer 30. If this light is incident again on filter 46 it may be transmitted provided it is incident within the permitted angular range. Consequently the filter 46 provides a positive gain in luminance on the projection screen 12. Another characteristic of the interference filter 46 is that the passband characteristic shifts to lower wavelengths the greater the angle of incidence of the light. Both these effects are illustrated in FIG. 5 which shows the spectrum of a terbium activated green phosphor material. The phosphor characteristic 5A illustrates the situation when no filter is present. This characteristic spectrum is almost independent of the emission angle. The purity of the green light emitted will be affected by the presence of light in the red and blue parts of the wavelength spectrum. Characteristics 5B, 5C, 5D and 5E illustrate the effect of the presence of an interference filter on light emitted by the phosphor layer and incident on the filter at 0°, 15°, 30° and 45° with respect to the normal to the filter, respectively. A comparison of characteristics 5A to 5E confirm the increase in gain by the presence of the filter 46 and the enhanced purity of the spectrum. The enhanced color purity leads to a considerably reduced chromatic aberration in imaging on the projection screen.

Figure 6:
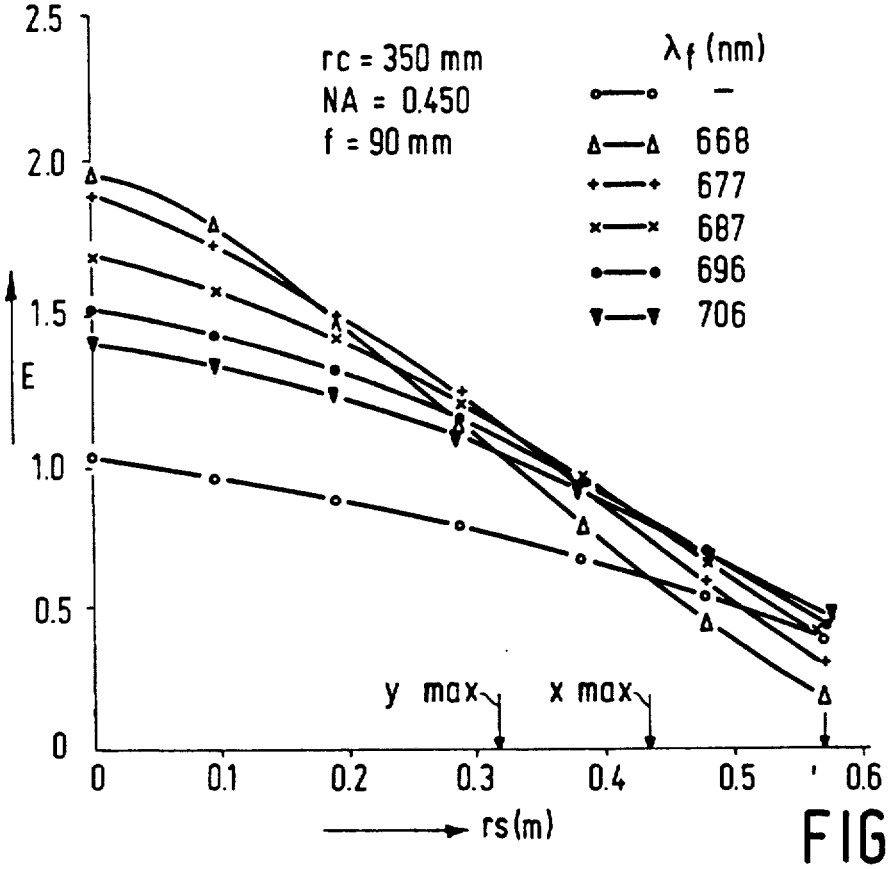
FIGS. 6 and 7 show the gains in screen luminance obtained by using interference filters with different focal length lenses.

Different optical thicknesses of the filter layers, including choosing different values for p and $\lambda_f$ change what is termed the filter cut-off angle, the filter cut-off angle being the incident light angle at which the filter transmission has decreased to 50%. The effect of these changes is illustrated in FIG. 6 which shows the illuminance (E) distribution on the projection screen 12 from the center (rs=0) to the outer diagonal corners (rs=0.57 meters), the lens focal length, f, being equal to 90 mm and the numerical aperture being 0.450, the scanned phosphor area of the display tube faceplate having a diagonal of 125 mm and the radius of curvature (rc) of the internal spherical surface of the faceplate 20 being 350 mm. In FIG. 6, illuminance produced without the use of an interference filter is indicated by circles and the light output has been normalised to unit illuminance at the center, rs=0. The five other curves relate to $TiO_2/SiO_2$ modified quarter-wave 20-layer interference filters with p-values of 1.228, 1.224, 1.263, 1.279 and 1.298 and corresponding cut-off angles (where the filter transmittance is 50%) of 27°, 32°, 37°, 41° and 46°. For the green Tb line with a principal wavelength, $\lambda=544$ nm, the respective values of $\lambda_f(=p\times\lambda)$ are 668, 677, 687, 696 and 706 nm. A comparison of these curves shows that the smaller the cut-off angle then the higher is the gain at the center but the situation is substantially the reverse at the corners although there is a general equality amongst the larger cut-off filters at the corner.

When shorter focal length lenses are used with the same size display tube to project on to the same size viewing screen, both the distance from the display tube to the lens entrance pupil and the distance from the lens exit pupil to the viewing screen become smaller, thus leading to a more compact cabinet. The decrease in the distance from display tube faceplate to lens entrance pupil also increases the tilt in the acceptance angles of the lens. The angular cut-off of the interference filter then more severely limits the light being collected from off-centre parts of the phosphor layer, leading to less gain in the corners and producing a color shift which in the case of a green terbium activated phosphor is towards the blue part of the spectrum.

Figure 7:
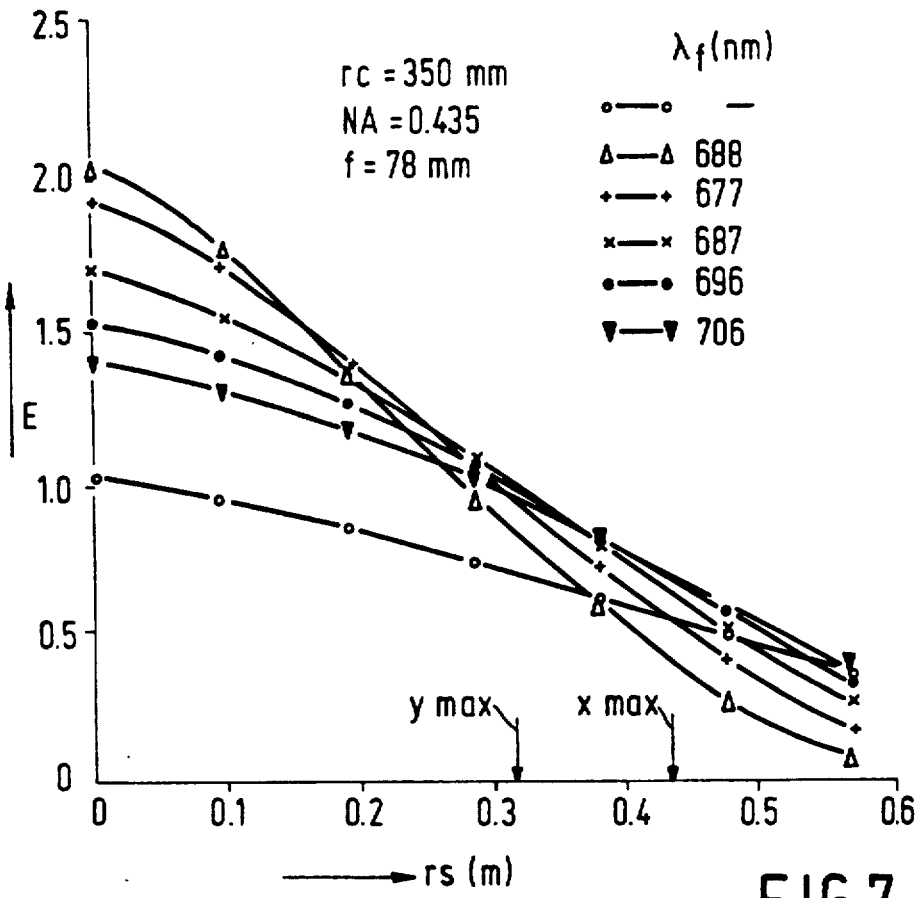

For a shorter focal length lens (f=78 mm) FIG. 7 shows indeed that, when the same filters are used as in FIG. 6, the corner illumination on the projection screen is reduced. The feature remains that the filter with the smallest of the cut-off angles ($\lambda f=668$ mm) has the highest gain at the center and the least gain in the corners at that this least gain is more pronounced for the shorter focal length lens. The filter with the largest of the cut-off angles ($\lambda_f=706$) enables an acceptable corner illumination to be obtained at the expense of decreased illumination at the centre.

The filter cut-off angle of the inventive display tube smoothly varies with increasing distance from the center and is greater at the corner than at the center. This is made possible by the optical thickness of filter layers being greater at the corners than at the center. The percentage change in optical thickness of the filter layers should be substantially the same for all the filter layers leading to a corresponding change in cut-off angle. A filter can be optimised by making the cut-off angle at the center between 3° and 16° smaller than in the corners, which corresponds to an increase in thickness from the center to the corners of between about 1% and 5%.

The change in the optical thickness of the filter layers can be achieved in a number of ways. Firstly to vary the actual thickness of each filter layer so that it is greater at the corners of the faceplate than at the center, the refractive index of the filter layer material being constant. Secondly to vary both the layer thickness and the refractive index of the material.

Figure 8:
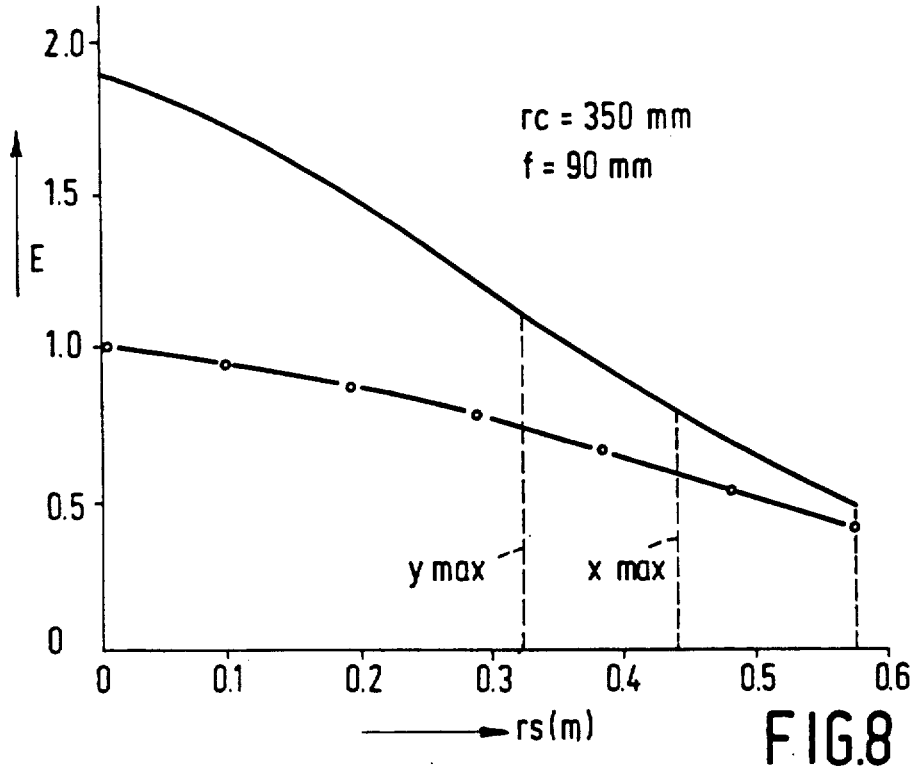
FIG. 8 illustrates the improved gain curve obtained by varying the cut-off angle across the filter layers.

In FIG. 8 the continuous line illustrates the illumination E of a projection screen plotted against the radial distance from the center, for a system having a projection display tube with a faceplate having a diagonal of 125 mm and a spherically curved screen of radius of curvature 350 mm and a lens having a NA=0.450 and a focal length of 90 mm. The illumination E has a high value at the center rs=0 which corresponds to a filter cut-off angle of 32° ($\lambda_f=677$) and also a high corner illumination which corresponds to a filter cut-off angle of 46° ($\lambda_f=706$ mm). For comparison, the lower curve with open circles gives the illumination without an interference filter.

It is possible to improve the corner illumination by reducing the radius of curvature (rc) of the faceplate 20 to say 200 mm from say 350 mm. However, reducing the radius of curvature causes problems with evaporation of the filter layers, with sedimenting the phosphor material, with more pronounced defocusing of the electron beam in the projection television cathode ray tube, requiring dynamic correction to obtain a sharp image, and with raster distortion.

The evaporation of filters, having increasing thickness of layers towards the corners onto convex curved faceplates has involved the development of techniques which go beyond those used in evaporating even thickness layers onto concave curved or flat substrates.

Figure 9:
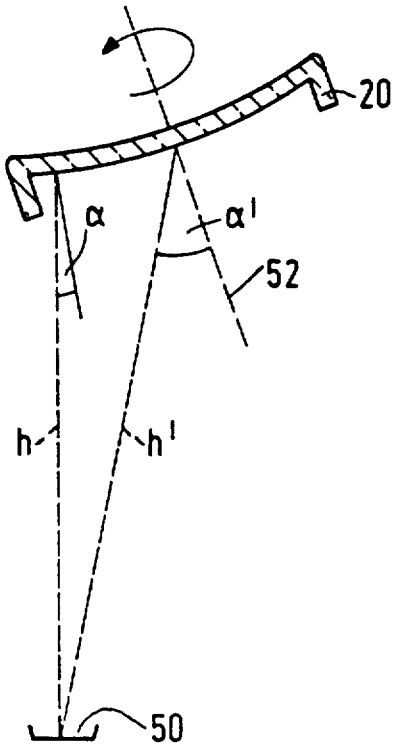
FIG. 9 is a diagram illustrating one method by which the thickness of filter layers, and thereby the cut-off angles, can be varied.

FIG. 9 illustrates diagrammatically one method of evaporation by which a smooth increase in the thickness of a filter from the center to the corner can be achieved. The essence of this evaporation method lies in obliquely evaporating the filter layer material onto the internal surface of a curved faceplate 20. The faceplate is so disposed relative to a pair of evaporated sources 50 that the distance h to the adjacent edge of the faceplate is substantially less than the distance h' to the center of the faceplate. Consequently less material is evaporated at the center than at the edge. Rotating the faceplate about its axis 52 will ensure circularly symmetric deposition over the entire area of the faceplate, with still a thicker filter layer near the corners because the deposition of filter material is proportional to $\cos\alpha/h^2$, which averaged over the rotations may yield a higher value than $\cos\alpha/h'^2$.

Figure 10:
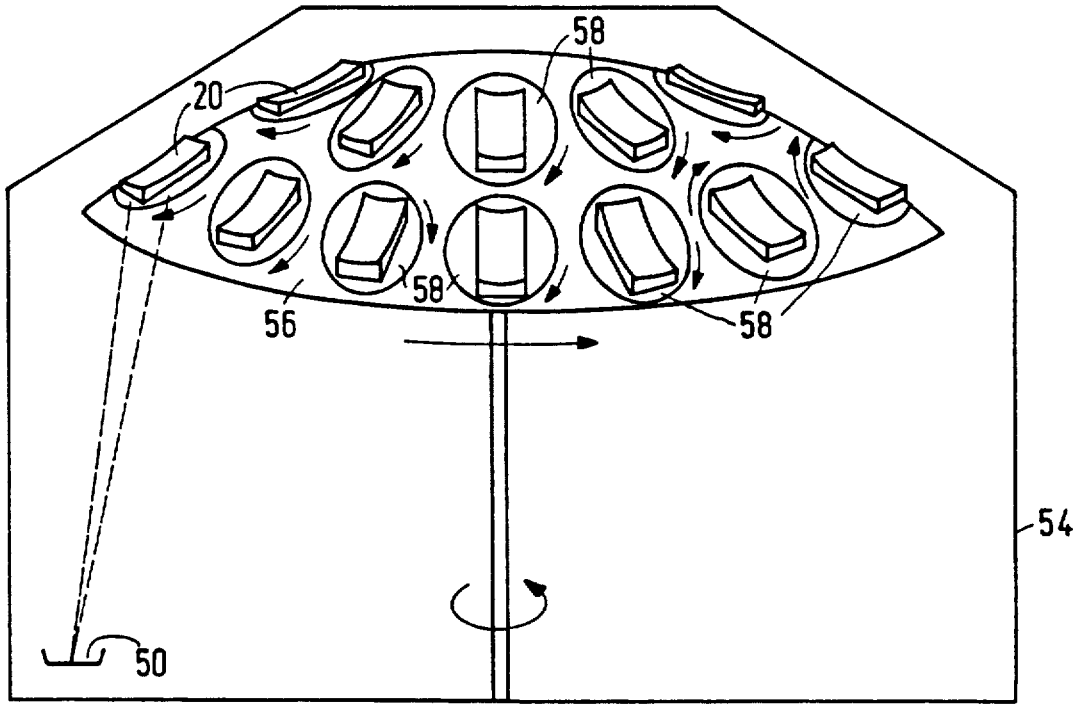
FIG. 10 is a diagrammatic view of one possible apparatus for implementing the method illustrated in and described with reference to FIG. 9.

Method by which this technique can be implemented is illustrated diagrammatically in FIG. 10. In a known planetary type of evaporation apparatus the substrates onto which layers are to be evaporated are mounted on a calotte 56 rotatably mounted inside a vacuum chamber 54. In order to evaporate variable thickness layers in accordance with the technique described with reference to FIG. 9, the calotte 56 is constructed so that it comprises a plurality of turntables 58 each of which is rotatable about its own axis. The faceplates 20 are placed convex face downwards onto its respective turntable 58. The evaporation sources 50 are positioned off-axis so that the material evaporated from the evaporation source lands obliquely on the rotating substrates. By using the turntables 58 which have a planetary rotation with respect to that of the calotte 56, a plurality of faceplates can be treated batchwise during any one pump down of the vacuum chamber 54.

Disadvantages of this method are that the construction of the planetary system is more complicated than one without separate turntables 58 and that the provision of the turntables 58 means that the number of faceplates in a batch which can be processed is about 50% to 60% of the number which can be processed using a calotte without turntables. Oblique evaporation also produces less dense, more porous layers which are prone to suffer more from crazing when subsequently annealed, compared to layers which are evaporated substantially perpendicularly onto the substrate surface.

Figure 11:
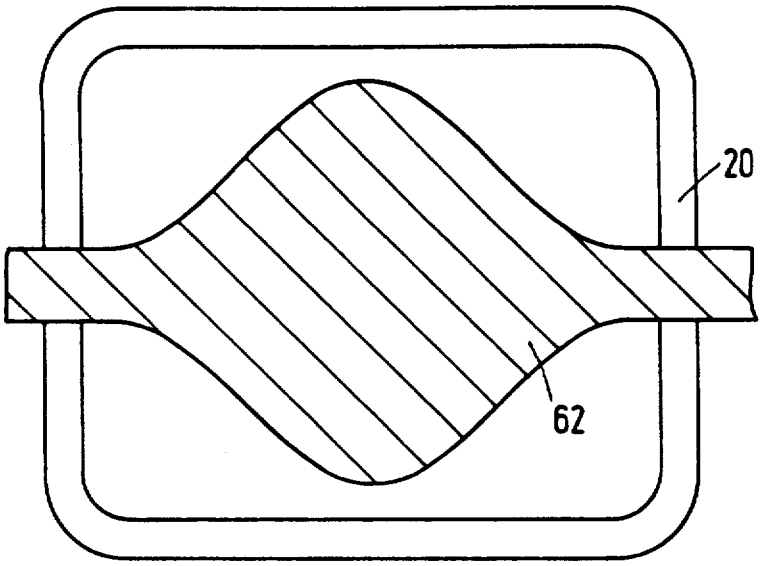
FIG. 11 is a diagram illustrating the principle of another method by which the thickness of filter layers, and thereby the cut-off angles, can be varied.

A simplar method which avoids the abovementioned problems but provides an acceptable variation in the layer thicknesses between the center and the corners of a faceplate makes use of the fact that the faceplates are rectangular with a 3:4 or 3:5 or 9:16 aspect ratio and are not circularly symmetrical. Referring to FIG. 11 if the central portion of the faceplate 20 is covered intermittently by a masking member 62, then the peripheral areas of the faceplate surface remain exposed more continuously so that more material is deposited thereon than at the center.

Figure 12:
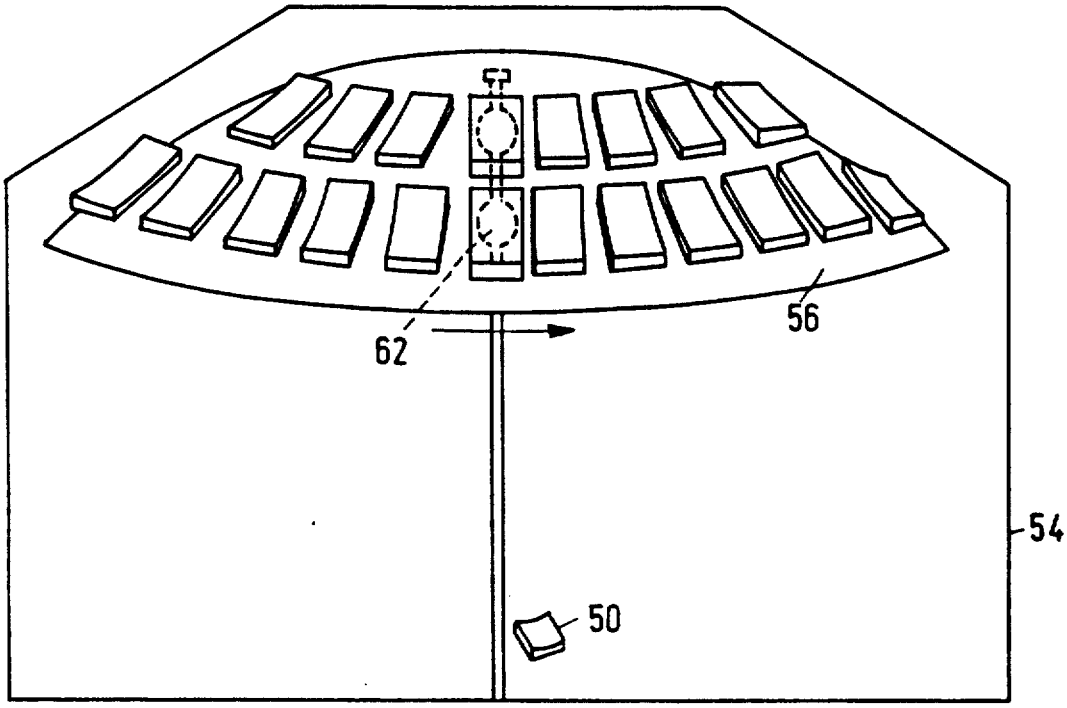
FIG. 12 is a diagrammatic view of an apparatus or implementing the method illustrated in and described with reference to FIG. 11.

FIG. 12 is a diagram of an apparatus for applying this method. In a vacuum chamber 54 a rotatable calotte 56 provides support for a plurality of substantially rectangular faceplates 20, possibly with rounded corners. The calotte 56 has substantially rectangular apertures therein which are so oriented that the longer x-axes of the faceplates lie along imaginary radial lines extending from the top of the calotte 56. For a medium size evaporation apparatus there are two rings of apertures, for a larger size evaporation apparatus it will be advantageous to use three rings of apertures to accommodate a substantially larger number of faceplates. In operation the calotte 56 is rotated about its axis. The evaporation sources 50 are so disposed beneath the underside of the calotte 56 that evaporated particles are incident on the faceplates perpendicularly or at a sufficiently small angle relative to a normal to the faceplate surface, for example smaller than 15 degrees, that a succession of dense layers is built-up on the faceplate surface. A non-rotatably mounted, radially extending, masking member 62 is arranged between the evaporation sources 50 and the underside of the calotte 56 in order to modify the thickness variation due to evaporation on convexly curved faceplates 20. The precise shape of the masking member 62 is determined partly by geometric calculations based on the wanted thickness variation and based on known angular distributions of the evaporated filter materials and partly empirically. One has a choice to make use of either one masking member which simultaneously corrects for the non-homogeneous angular distribution of the evaporated material and which gives the desired thickness variation for each filter, or two masking members one for correcting the non-homogeneous angular distribution and one for the thickness variation.

Under normal perpendicular evaporation on to an unmasked convex faceplate there will be a thickness decrease towards the corners. This variation is opposite to what is desired for producing an increase in the cut-off angles at the corners of the mask.

Assuming that the evaporation sources 50 are disposed 850 mm from (below) the center of a faceplate having a spherically curved internal surface with a radius of curvature of 350 mm, a length (in the x-direction) of 100 mm and a width (in the y-direction) of 75 mm, then the thickness of the layers can be calculated using the following relationship:

$$\text{Amount of material deposited} \propto \frac{\text{cosine } \alpha}{(\text{Evaporation distance})^2}$$

The angle $\alpha$ is the sum of the angle of curvature of the surface and the angle between the evaporation source (the electron gun) and the relevant point on the faceplate. For the center this latter angle is zero. In the case of the mask exemplified above and assuming that the x-axis and y-axis intersect at the center, then for an unmasked faceplate the following thickness variations relative to the center have been calculated.

| | |
|---|---|
| Ends of y-axis ($y_{max}$) | 1.8% thinner. |
| Ends of x-axis ($x_{max}$) | 3.2% thinner. |
| Corners (ends of diagonals) | 5.0% thinner. |

Using an exemplary masking of the central area of the faceplate, then the following changes were achieved, reference being made to the relative thickness at the center:

| | |
|---|---|
| Ends of y-axis ($y_{max}$) | No change 1.8% thinner. |
| Ends of x-axis ($x_{max}$) | 7% gain in thickness. Net 3.8% thicker. |
| Corners (ends of diagonals) | 7% gain in thickness. Net 2% thicker. |

Some tolerancing on these thicknesses is possible but the amount of the tolerancing and its thinner/thicker range relative to the center differ depending on the distance to the center. By way of example at the center the tolerance is ±1% at y max the tolerance margins can be greater, between −2% and +2% relative to the center, at x max the tolerance regions is +1% to +4,5% and at the end of the diagonal in the corners the tolerance is +1% to +6%. To avoid misunderstanding, the thickness tolerance is related to the nominal thickness at the center so that a tolerance figure of +1% to +6% means the corner thickness must be at least 1% thicker than at the center but not exceed 6% greater than at the center. If one departs from the tolerance ranges then the cut-off angles obtained may lead to an inbalance in the contributions between the small angle and wide angle light towards the gain. In general the further one gets away from the center the less the contribution to the gain from the small angle light (near 0 degrees) and the greater the contribution from the wider angle light (near 35 to 50 degrees) and vice versa.

If desired the shape of the convex internal surface of the faceplate 20 may be aspherical rather than spherical. In one embodiment the aspherical surface may have a larger curvature, that is a smaller radius of curvature, near the center of the faceplate and a smaller or substantially no curvature at larger distances from the center, particularly in the proximity of the corners. The variation in the proximity of the corners. The variation in the thickness of the filter layers, relative to their thickness at the center, is such that the thickness at the ends of the y-axis (y max) is smaller than at the center and the thickness at the ends of the x-axis (×max) and at the ends of the diagonals is greater than at the center. Also the layer thickness at the ends of the diagonals is less than the thickness at x max but greater than at the center. In an embodiment of an aspherical faceplate the curvature near the center is close to or equal to 350 mm (radius) and increases (or becomes less curved) at larger distances from the center, ending with a curvature between 500 mm (radius) and infinity (flat) in the corners. From the point of view of depositing the filter layers a preferred example of an aspherical faceplate for a projection television tube with about a 3" (75 mm)×4" (100 mm) scanned phosphor area has a spherically curved central portion having a radius of curvature between 300 and 400 mm, for example 350 mm, and extending 35 to 45 mm from the center of the faceplate and thereafter the remaining area has a substantially infinite curvature, without any discontinuity by using the tangent to the curved part of the faceplate at the transition point.

Another form of an aspherical faceplate which has advantages from an optical point of view has a central region having a large radius of curvature and an outer region having a smaller radius of curvature.

Interference filters having a predetermined variation in cut-off angles have been found to have a superior optical performance when used with short focal length (between 0.5 to 0.75 times the diagonal of the scanned phosphor are a of the faceplate) lenses compared to filters having a constant cut-off angle. Also by being able to produce the filters using a substantially perpendicular evaporation method will mean that the layers will be dense, have a small porosity, and will exhibit little or no crazing after tube processing.

Although the present invention has been described with reference to a terbium activated green phosphor, it is to be understood that the invention can be utilised with other green phosphors as well as with known blue and red luminescing phosphors which are suitable for use in projection color television tubes.

When the filter thickness increases in both the x- and y-directions, that is radially symmetrically, substantially no color change occurs over the whole projection screen. When the filter thickness increases only in the x-direction, as in the described and illustrated embodiments of the present invention, the thickness variation can be chosen such that substantially no color correction is required in the x-direction, that is, along the lines. The resulting color variation along the y-direction can either by accepted or be corrected by a low-frequency electronic adjustment of the electron beam currents in one or more of the red, green and blue projection television cathode ray tubes. For instance, use can be made of a parabolic correction at the field frequency.

What is claimed is:

1. A projection television display tube comprising an envelope having an optically transparent substantially rectangular faceplate, the internal surface of the faceplate being convex as viewed from the interior of the envelope, a multilayer interference filter on the internal surface of the faceplate, and a cathodoluminescent screen on the filter, the layers of the filter each having an optical thickness nd at the center of the filter wherein n is the refractive index of the material of the layer and d is the thickness, [the optical thickness of the individual layers being between $0.2\lambda_f$ and $0.3\lambda_f$, the average optical thickness being $0.25\lambda_f$, wherein $\lambda_f$ is equal to $p\lambda$, where $\lambda$ is the desired central wavelength which is selected from the spectrum emitted by the luminescent material and p is a number between 1.18 and 1.32,] and wherein the cut-off angle of the filter is greater at the corners than at the center, the cut-off angle being the minimum angle at which light of a given wavelength is reflected rather than transmitted.

2. A projection television display tube as claimed in claim 1, wherein the optical thickness of each of the filter layers, [hence p and $\lambda_f$,] is greater at the corners than at the center.

3. A projection television display tube as claimed in claim 2, wherein the optical thickness of each of the filter layers increases progressively from the center to the corners.

4. A projection television display tube as claimed in claim 2, wherein the thickness of each filter layer is greater at the corners that at the center and the refractive index of the material of each layer is substantially constant.

5. A projection television display tube as claimed in claim 2, wherein the thickness of each filter layer is greater at the corners than at the center and the refractive index of the material at the center of each layer is slightly different relative to that at the corners.

6. A projection television display tube as claimed in claim 4 or 5, wherein the faceplate has a rectangular profile and, relative to the layer thickness at the center of the faceplate, the layer thickness at the ends of the shorter y-axis is less than at the center and the layer thickness at the ends of the longer x-axis is greater than at the center.

7. A projection television display tube as claimed in claim 4 or 5 wherein the internal surface of the faceplate is substantially spherical and the variation in the thickness of each of the layers, relative to its thickness at the centre, is such that the thickness at the ends of the y-axis is smaller than at the centre and the thickness at the ends of the x-axis and at the ends of the diagonals is greater than at the centre, and wherein the layer thickness at the ends of the diagonals is less than the thickness at x max but greater than at the centre.

8. A projection television display tube as claimed in claim 7, wherein the spherical surface has a radius of curvature of 350 mm.

9. A projection television display tube as claimed in claim 4, wherein the internal surface of the faceplate is aspherical.

10. A projection television display tube as claimed in claim 9, wherein the internal surface of the aspherical faceplate has a larger curvature near the center of the faceplate and a smaller or substantially no curvature at larger distances from the center, particularly in the proximity of the corners, and wherein the variation in the thickness of the layers, relative to their thickness at the center, is such that the thickness at the ends of the y-axis is smaller than at the center and the thickness at the ends of the x-axis and at the ends of the diagonals is greater than at the center, and the layer thickness at the ends of the diagonals is less than the thickness at the ends of the x-axis but greater than at the center.

11. A projection television display tube as claimed in claim 10, wherein the aspherical surface has a curvature close to or equal to 350 mm near the center of the faceplate and becomes less curved at larger distances from the center, ending with a curvature between 500 mm and infinity in the corners.

12. A projection television display tube as claimed in claim 10, wherein the central region of the convex faceplate is substantially spherical with a radius of curvature between 300 and 400 mm, the region beyond the central region is substantially conical having an infinite radius of curvature, and the conical region extends tangentially from the central spherical region.

13. A projection television display tube as claimed in claim 9, wherein the radius of curvature of the internal surface of the faceplate is larger at a central region than at the outer region.

14. A projection television display tube as in claim 1 wherein the interference filter comprises alternate layers of high and low refractive index materials.

15. A projection television display tube as claimed in claim 14, wherein the high refractive index material is selected from the group consisting of $TiO_2$, $Ta_2O_5$ and $Nb_2O_5$.

16. A projection television display tube as claimed in claim 14 or 15, wherein the low refractive index material is selected from the group consisting of $SiO_2$ and $MgF_2$.

17. A projection television display tube as in claim 1, wherein the interference filter comprises at least 9 layers.

18. A projection television display tube as in claim 1, wherein the filter has between 14 and 30 layers.

19. A projection television system including three projection television display tubes respectively having cathodoluminescent screens luminescing in different colors, focusing lens means associated with each display tube screens are merged to form a multicolored image, wherein each tube has a substantially rectangular faceplate which is convex as viewed from inside the envelope, at least one display tube has a multilayer interference filter between its cathodoluminescent screen and its faceplate, the filter comprising at least 6 layers each having an optical thickness nd at the center of the filter, wherein n is the refractive index of the material of the layer and d is the thickness, [the optical thickness of the individual layers of the filter being between $0.2\lambda_f$, and $0.3\lambda_f$, the average optical thickness throughout the multilayer stack being $0.25\lambda_f$ wherein $\lambda_f$ is equal to $p\lambda$, where $\lambda$ is the desired central wavelength which is selected from the spectrum emitted by the lumninescent material and p is a number between 1.18 and 1.32,] and wherein the cut-off angle is greater at the corners than at the center, the cut-off angle being the minimum angle at which light of a given wavelength is reflected rather than transmitted.

20. A system as claimed in claim 19, wherein the focusing lens means has a focal length of less than 100 mm.

21. A system as claimed in claim 19, wherein the optical thickness of each of the filter layers, [hence p and $\lambda_f$,] is greater at the corners than at the center.

22. A system as claimed in claim 21, wherein the optical thickness of each of the filter layers increases progressively from the center to the corners.

23. A system as claimed in claim 21, wherein the thickness of each filter layer is greater at the corners than at the center and the refractive index of the material of each layer is substantially constant.

24. A system as claimed in claim 21, wherein the thickness of each filter layer is greater at the corners than at the center and the refractive index of the material at the center of each layer is slightly different relative to that at the corners.

25. A system as claimed in claim 23, wherein the convex faceplate has a rectangular profile and, relative to the layer thickness at the center of the faceplate, the layer thickness at the end of the shorter y-axis is less than at the center and the layer thickness at the end of the longer x-axis is greater than at the centre.

26. A system as claimed in claim 23, wherein the internal surface of the convex faceplate is spherical and the variation in the optical thickness of the layers, relative to the optical thickness at the center is such that the optical thickness at the ends of the y-axis is smaller than at the centre and the thickness at the ends of the x-axis and at the ends of the diagonals is greater than at the centre, and wherein the layer thickness at the ends of the diagonals is less than the thickness at x max.

27. A system as claimed in claim 26, wherein the spherical surface has a radius of curvature of 350 mm.

28. A system as claimed in claim 27, wherein $$f + 10000/rc < D$$

where f is the focal length of the lens means, rc is the radius of curvature of the faceplate and D is the diagonal or diameter of the scanned phosphor area, f, rc and D being in millimeters.

29. A system as claimed in claim 25, wherein the internal surface of the faceplate is aspherical.

30. A system as claimed in claim 29, wherein the internal surface of the aspherical faceplate has a larger curvature near the center of the faceplate and a smaller or no curvature at larger distances from the center, particularly in the proximity of the corners, and wherein the variation in the thickness of each of the layers, relative to its thickness at the center, is such that the thickness at the ends of the y-axis is smaller than at the center and the thickness at the ends of the x-axis and at the ends of the diagonals is greater than at the center, and the layer thickness at the ends of the diagonals is less than the thickness at the ends of the x-axis but greater than at the center.

31. A system as claimed in claim 30, wherein the aspherical surface has a curvature close to or equal to 350 mm near the center of the faceplate and becomes less curved at larger distances from the center, ending with a curvature between 500 mm and infinity in the corners.

32. A system as claimed in claim 29, wherein the radius of curvature of the internal surface of the faceplate is larger at a central region than at the outer region.

33. A system as claimed in claim 19, wherein the interference filters comprises alternate layers of high and low refractive index materials.

34. A system as claimed in claim 33, wherein the high refractive index material is selected from the group consisting of $TiO_2$, $Ta_2O_5$ and $Nb_2O_5$.

35. A system as claimed in claim 33 or 34, wherein the low refractive index material is selected from the group consisting of $SiO_2$ and $MgF_2$.

36. A system as claimed in claim 19, wherein the filter has between 14 and 30 layers.

37. A system as claimed in claim 23, wherein in at least one of the projection television display tubes the thickness of each of the filter layers increases in the x-direction and decreases in the y-direction and electronic means are provided for effecting color correction with a field frequency in the or in each display tube having the said thickness variation.

38. A method of producing a multilayer interference filter onto convex surface of a substantially rectangular faceplate having a longer x-axis and a shorter y-axis, the thickness of each layer being greater at the corners than at the center, comprising mounting the faceplate on a rotatable calotte, evaporating a filter material at angles smaller than $\times 15°$ to the perpendicular to the convex surface onto the faceplate [using electron beam evaporation,] the calotte being rotated, and varying the deposition of evaporated material onto the faceplate by selective masking so that the layer thickness increases with increasing x, with $x=0$ at the center of the faceplate.

39. A method as claimed in claim 38, wherein a predetermined central area of the convex surface of the faceplate is masked intermittently by at least one shield as the faceplate is rotated relative to the electron gun.

40. A method as claimed in claim 38 or 39, wherein the calotte is concave viewed from the electron gun and each faceplate is disposed with its x-axis substantially radially of the calotte.

41. A method of producing a multilayer interference filter on a convex surface of a substantially rectangular faceplate, the thickness of each layer being greater at the corners than at the center, comprising obliquely evaporating a filter material onto the convex surface of the faceplate as it is rocked substantially continuously, the distance from the electron gun to the center of the faceplate being greater than that to the adjacent corner of the faceplate.

42. A method as claimed in claim 41, wherein the faceplate is rotated in a substantially planetary manner relative to the electron gun.

*43. A projection television display tube as claimed in claim 1, wherein the optical thickness of the individual layers being between $0.2\lambda_f$ and $0.3\lambda_f$, the average optical thickness being $0.25\lambda_f$, wherein $\lambda_f$ is equal to $p\lambda$, where $\lambda$ is the desired central wavelength which is selected from the spectrum emitted by the luminescent material and p is a number between 1.18 and 1.36.*

*44. A projection television system as claimed in claim 19, wherein the optical thickness of the individual layers being between $0.2\lambda_f$ and $0.3\lambda_f$, the average optical thickness being $0.25\lambda_f$, wherein $\lambda_f$ is equal to $p\lambda$, where $\lambda$ is the desired central wavelength which is selected from the spectrum emitted by the luminescent material and p is a number between 1.18 and 1.36.*

*45. A method as claimed in claim 38, wherein the evaporation is electron beam evaporation.*

* * * * *